United States Patent [19]

Torok

[11] 3,998,305
[45] Dec. 21, 1976

[54] ARRANGEMENT IN CURRENT SUPPLY SYSTEMS

[75] Inventor: Vilmos Torok, Vasteras, Sweden

[73] Assignee: Allmanna Svenska Elektriska Aktiebolaget, Vasteras, Sweden

[22] Filed: Dec. 12, 1974

[21] Appl. No.: 532,209

[30] Foreign Application Priority Data

Jan. 15, 1974 Sweden ............................ 74004615

[52] U.S. Cl. ...................................... 191/5; 191/2; 191/72

[51] Int. Cl.² ............................................ B60L 9/00

[58] Field of Search ............... 191/2, 3, 5, 7, 23 A, 191/86, 72, 33 R, 45 A, 34, 41, 53; 104/124; 246/9, 65, 67, 69, 63 R, 34 R, 34 CT, 122 R; 180/2

[56] References Cited

UNITED STATES PATENTS

2,024,664   12/1935   Shaver ........................... 246/63 R

FOREIGN PATENTS OR APPLICATIONS

12,729   7/1903   Austria ................................. 191/5
46,216   3/1966   Germany ............................. 191/72

*Primary Examiner*—Trygve M. Blix
*Assistant Examiner*—Reinhard J. Eisenzopf
*Attorney, Agent, or Firm*—Watson, Cole, Grindle & Watson

[57] ABSTRACT

In a current supply system for wheeled vehicles which includes a DC generating device and substantially parallel running over-head lines provided with current collectors, a closed AC circuit is provided which is independent of the current collector and includes an AC generating device which feeds the over-head lines, as well as a device connecting the lines together. The DC and AC generating device includes a first rectifying device which is connected to a three-phase AC network and a generating DC network with a superposed AC component.

6 Claims, 10 Drawing Figures

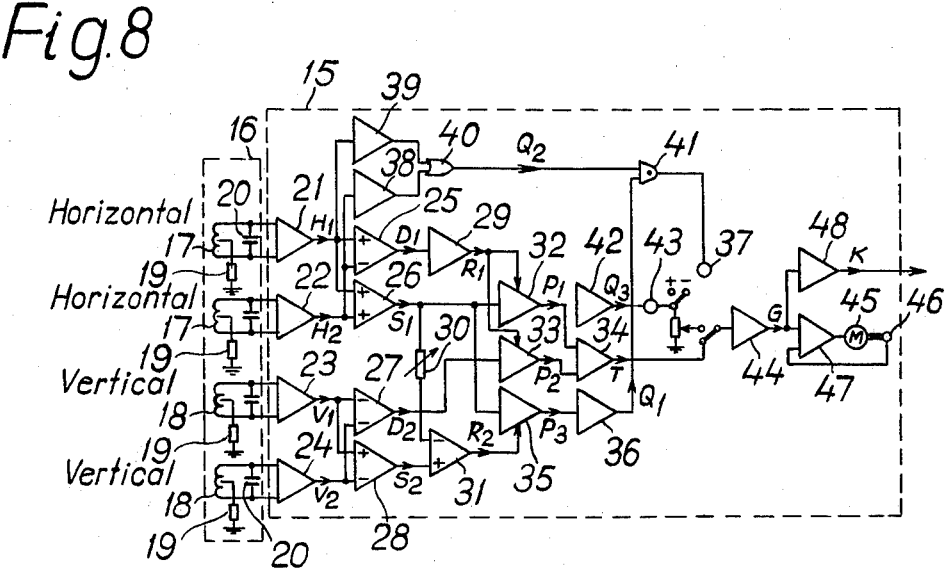

ARRANGEMENT IN CURRENT SUPPLY SYSTEMS

BACKGROUND OF THE INVENTION

Field of the Invention

The present invention relates to an arrangement in current supply systems, comprising a DC generating device and substantially parallel-running overhead lines for non-railbound vehicles provided with current collectors.

At the present, the use of non-railbound vehicles, such as trolley buses and cable trucks, involves the limitation that the current collector of a first vehicle blocks the overhead line for other vehicles, so that it is not possible for a following vehicle to drive past the first vehicle. Furthermore, discontinuities in the overhead line cannot be allowed, so the realization of special crossings and switches between separate vehicle lines requires complicated constructions.

Suggestions have been put forward to avoid these problems by introducing hybrid vehicles, that is vehicles which are driven mainly through the contact of the current collector with the overhead contact system, and when any of the above-mentioned situations arises, removing the current collector from the overhead line and utilizing a second source of operation connected to the drive system of the vehicle, such as a conventional combustion engine, battery operation, or the like, for passage past a vehicle, a crossing, and so on. However, the problem remains that the current collector must be manually adjusted to the overhead line, so an interruption in the operation of the vehicle is necessary, and therefore the advantage derived through the hybrid operation cannot be utilized completely.

SUMMARY OF THE INVENTION

With a system according to the present invention it will be possible to connect the current collector of the vehicle automatically to the intended overhead line, and in this way hybrid operation can be utilized without a time-consuming adjustment of the current collector when resuming the operation by wire, thus eliminating the manual adjustment of the current collector.

According to the invention, in conjunction with a current supply system which includes a DC generating device and substantially parallel overhead lines for non-rail bound vehicles provided with current collectors, there is a closed AC circuit which is independent of the current collector and includes an AC generating device, an AC generating device connected to the overhead lines and a device connecting the over-head lines together. An impedance element formed by a capacitor is arranged between the over-head lines. Means are provided which control an arrangement for removing the current collector from the wires and restoring it to the wires.

BRIEF DESCRIPTION OF THE DRAWINGS

The system according to the invention will be described more fully with reference to the accompanying drawing, in which FIG. 8 shows possible circuits for a detecting and control device applied to the current collector; and FIGS. 9 and 10 show an example of a suitable mechanical construction for a current collector which is movable in both vertical and horizontal planes.

DESCRIPTION OF THE PREFERRED EMBODIMENTS

Figure 1:
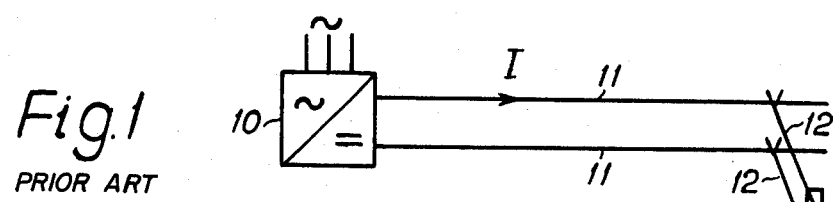
FIG. 1 illustrates the principle of conventional current supply in the case of wire traction.

The principle of a conventional current supply system for wire-operated vehicles is, as appears from FIG. 1, that a rectifying device 10 rectifies a three-phase line current and delivers a direct current to two parallel contact lines 11 which are traversed by the current I only when a current collector 12 is in contact with both contact lines 11, thus forming a close current circuit.

Figure 2:
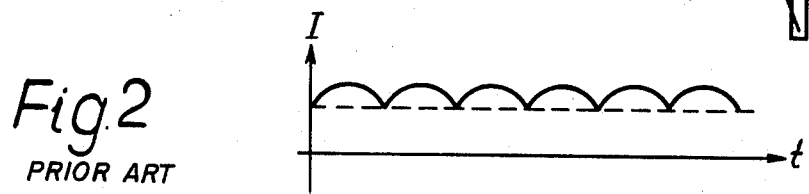
FIG. 2 shows the current appearing on the contact line.

In practice it is difficult to achieve a pure DC component, and in general the current I has the appearance shown in FIG. 2, with a superposed AC component, a ripple.

With a means according to the invention this ripple is allowed to traverse the contact lines, so that a magnetic field appears around the contact lines, said field being utilized by detectors arranged on the current collectors of the device as a detecting field, thus making possible an automatic control of the current collectors by the contact lines.

The principle of the invention will be illustrated by the following examples.

Figure 3:
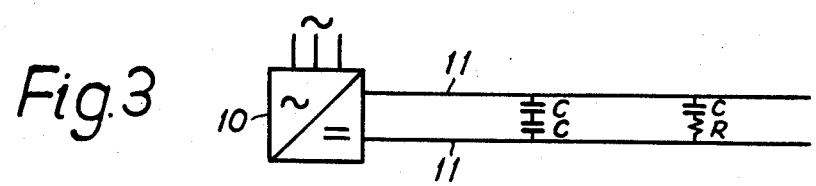
FIG. 3 shows a first alternative of a closed AC circuit independent of the current collector where the contact lines are connected by impedance elements.

FIG. 3 shows how capacitors C, or such capacitors in series with resistors R, connect the contact lines 11 together by AC current, so that the contact lines are traversed by said AC component.

Figure 4:
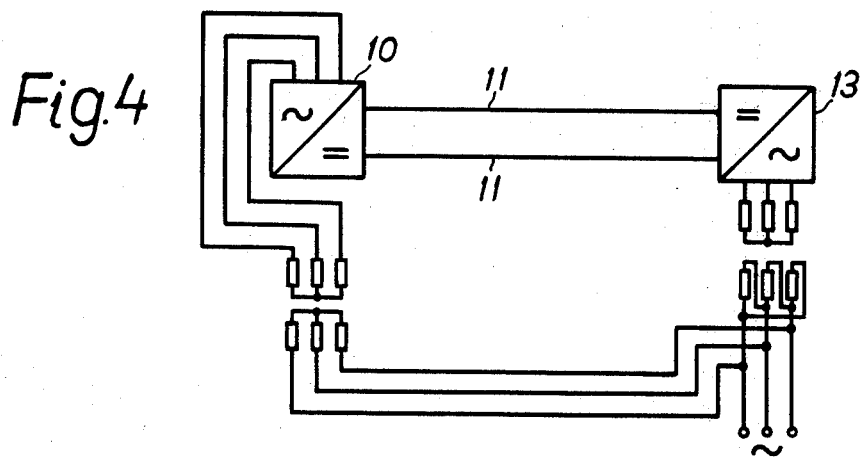
FIG. 4 shows a second embodiment of the means according to the invention where two rectifying devices connected to the contact lines generate two AC components which are offset in phase with respect to each other.

Alternatively, as is clear from FIG. 4, two consecutive supply stations connected to the contact lines 11 with their respective rectifying devices 10 and 13 may be arranged so that the AC components delivered from the two rectifying devices are offset in phase in relation to each other, an AC current then traversing the contact lines. By connecting one rectifying device 13 in the manner shown in FIG. 4 through a Δ-connection to the network, for example, a phase displacement of 30° is obtained.

Figure 5:
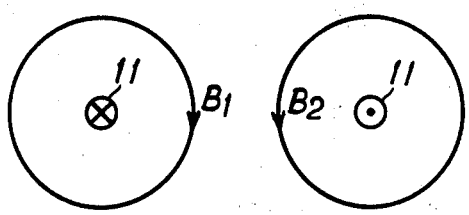
FIG. 5 shows the magnetic fields generated around the contact lines by the AC current.

The AC current traversing the contact lines 11 gives rise to a magnetic field $B_1$ and $B_2$, respectively, around each contact line 11, as is clear from FIG. 5.

By detecting and seeking out the largest of the vertical components in the field resulting from the magnetic fields $B_1$ and $B_2$, and then operating the current collector with regard to horizontal field components from the respective magnetic field, an automatic adjusting of the current collector is possible.

Figure 6:
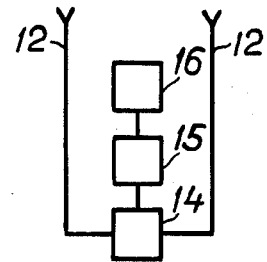
FIG. 6 shows the construction in principle of equipment for detecting said magnetic fields, which equipment is connected to the current collector.

As is clear from FIG. 6, a control device 15 can be connected to the drive device 14 of the current collector 12, which control device 15 is intended for controlling the movement of the current collector 12 and a detecting device 16 for magnetic fields connected to the control device 15.

Figure 7:
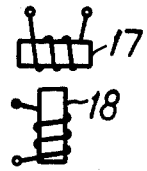
FIG. 7 shows an example of detecting devices included in the detecting equipment.

As is clear from FIG. 7, the detecting device 16 consists in its simplest form of a horizontal and a vertical detecting coil 17 and 18, respectively, for detecting the magnetic fields according to the above. The movements of the current collector 12 are controlled by the drive device 14 which operates the current collector to the desired position by way of control signals from the control device 15.

To obtain complete automatic control of the current collector, a current collector is required which is movable both in the horizontal and in the vertical direction.

In FIG. 8 the detecting device 16 is shown in detail. On each arm of the current collector there is arranged a detecting unit consisting of one horizontal detecting coil 17, and one vertical detecting coil 18, each such coil being connected to one earth-connected resistor 19 and one tuning capacitor 20.

FIG. 8 also shows a suitable circuit for the control device 15.

The magnetic fields detected by the coils 17 and 18 are transferred in the form of signals to amplifiers 21, 22, 23 and 24, respectively. Said amplifiers are, as are the said coils, tuned to the basic frequency in the ripple flowing in the contact lines.

The output signals $H_1$, $H_2$, $V_1$ and $V_2$ from said amplifiers 21–24 are added and subtracted to and from each other in the amplifiers 25, 26, 27 and 28.

In this way the difference $D_1$ between the signals coming from the horizontal coils 17 is created in the amplifier 25 and the sum $S_1$ between the signals from the horizontal coils is created in the amplifier 26.

Analogously, the difference $D_2$ and the sum $S_2$ of the signal from the vertical coils 18 are created in the amplifiers 27 and 28, respectively.

The difference signal $D_1$ is transferred to a square-wave amplifier 29, the output signal of which is used as a first reference signal $R_1$ during the synchronous rectification of the summation signals $S_1$ and $S_2$.

The difference signal $D_2$ and part of the summation signal $S_1$ (which part is controlled by a regulating device 30) constitute input signals to a squarewave amplifier 31 which forms a second reference signal $R_2$.

The summation signals $S_1$ and $S_2$ are each supplied to a synchronous rectifier 32 and 33, respectively. Said first reference signal $R_1$ is used as a reference signal. The signals $P_1$ and $P_2$ rectified by means of the rectifiers 33 and 33 are supplied to a dividing unit 34. From said unit 34 a control signal T is obtained.

Said control signal T is relatively non-linear with a varying degree of amplification, depending on the momentary vertical and lateral position of the current collector. Within a limited interval near a position of the current collector when it is symmetrically positioned laterally in relation to the contact lines, the signal T is however substantially linear and within this interval suitable for regulating purposes.

In order to be able to detect this interval, the summation signal $S_1$ is supplied to a synchronous rectifier 35, and as a reference said second reference signal $R_2$ is utilized. The rectified signal $P_3$ thus obtained is supplied to a level detector 36. If a positive signal is detected in this connection, this indicates that the regulating range is reached and that the control signal T can be switched further to a regulator 44 by means of a relay device 37 by the action of the output signal $Q_1$ from the level detector 36.

If asymmetry prevails in the magnetic fields around the contact lines, an incorrect indication of said regulating range can be made because of the fact that both the summation signal $S_1$ and reference signal $R_2$ are odd funtions of the position in relation to the centre of the regulating range. If asymmetry occurs these two signals could change phases on different occasions, which would lead to an incorrect indication.

In order to eliminate this risk of incorrect indication the control device 15 comprises two square-wave amplifiers 38 and 39 which form a square-wave signal of the signals $H_1$ and $H_2$ emanating from the horizontal coils 17. The mutual phase positions of these signals are compared in an OR-gate 40. Within a smaller range around the centre of said regulating range the signals are displaced 180° in relation to each other, an output signal $Q_2$ thus being obtained from the gate 40. This signal $Q_2$ is utilized as a complement to the signal $Q_1$ which controls the relay device 37 by way of an AND-gate.

It is possible that the current collector will be located outside said regulating range, and therefore information about its position with respect to the lines is required. This is achieved by means of a level detector 42 into which the signal $P_1$ is fed. The output signal $Q_3$ from the level detector controls a relay device 43 which switches in fixed references with varying polarities as input signals to the regulator 44. When the current collector is outside the regulating range, this is indicated by the fact that the level detector 42 influences the relay device to connect the fixed reference which is necessary because of the position of the current collector with respect to the lines.

The regulator 44 suitably consists of a proportional amplifier with filters which limit the transients which may arise in case of a change of references and in case of phase changes in the control and reference signals.

The output signal G from the regulator 44 is supplied, both to a speed regulation device 47 connected to a motor 45 with a speed measuring device 46, and to a level detector 48, which senses the position fault. If this fault is sufficiently small, the level detector 48 allows the current collector to be moved slowly upwards. If the position fault should be too great the movement in an upward direction is stopped. The output signal K is supplied to a regulating device for the movement of the current collector in horizontal direction.

FIG. 9 shows in a view from above a suitable construction for the current collector and FIG. 10 shows the same in a side view.

The current collector is applied to the roof 49 of the vehicle and consists of two parallel arms 50 and 51 which are joined to each other by means of a transverse arm 52 pivoted to the arms.

Each arm 50 and 51, respectively, is pivotable in the horizontal plane by means of a joint 53 and further movable by an angle $\alpha$ in the vertical plane by means of a joint 54.

The lateral movement is achieved by means of a lever 57, connected to one arm 51, said lever being divided into two parts 55 and 56 which are rotatable in relation to each other. By way of a screw nut 59, a DC motor 58 transmits the movement of the motor through swinging of the lever 57 into a movement of the arms 50 and 51 in the lateral direction. The transverse arm 52 assures a parallel movement of the arms 50 and 51.

The vertical movement is brought about by means of a pneumatic bellows 61 arranged between a slide surface 60 arranged on the roof 49 and the transverse arm 52, the volume of said bellows being regulated by the signal K according to FIG. 8 by way of an electromechanical valve (not shown).

To reduce the influence of the bellows 61 in lateral direction when the current collector is turned laterally, a guide arm 62 is arranged between the lever and the lower mounting plate, which guide arm 62 ensures that the bellows keep pace with the movement in the lateral direction.

The broken lines in FIG. 10 show the arm 51 in raised position. FIGS. 9 and 10 show only the lower parts of the arms 50 and 51 which are provided at their ends with connection devices, known per se, for making contact with the lines.

The system according to the invention can be accomplished in many ways within the scope of the following claims and is of course not limited to the embodiments shown. For example, a separate AC source, such as a tone generator, can be connected to the contact lines to generate the alternating current which generates the detectable magnetic fields.

I claim:
1. A transportation system comprising
a non-railbound vehicle,
an overhead line having two conductors (11),
said vehicle comprising a current collector (12) movably mounted thereon,
said current collector being engageable with said overhead line,
a DC power supply means (10) connected to said conductors for supplying tractive power to said vehicle,
an AC component generating means (10) connected to said conductors for generating an alternating current component therein and thereby an alternating electromagnetic field ($B_1, B_2$) in the vicinity of said line,
said vehicle having sensing means (16) for sensing said field and control means (15) connected to said sensing means for generating a signal (T) in response to displacement of the current collector in relation to said line.
2. Transportation system according to claim 1, said vehicle having actuating means (14,45) for moving said current collector in relation to the vehicle,
said control means being connected to said actuating means to cause said actuating means to move the current collector in dependence upon said signal so as to decrease said displacement.
3. Transportation system according to claim 1 comprising connecting means (C,R) connecting said conductors together.
4. Transportation system according to claim 3, said connecting means comprising an impedance element arranged between said conductors, said impedance element comprising a capacitor (C).
5. Transportation system according to claim 1, in which said DC power supply means and said AC generating means comprise a first current convertor (10) connected to and supplied from an AC network for generating a direct current with a superposed first AC component.
6. Transportation system according to claim 5, in which the connecting means comprise a second current convertor (13) connected to and supplied from an AC network for generating a direct current with a superposed second AC component, said second AC component being offset in phase with respect to said first AC component.

* * * * *